(12) United States Patent
Elkington et al.

(10) Patent No.: US 7,739,418 B2
(45) Date of Patent: Jun. 15, 2010

(54) RESOURCE MANAGEMENT SYSTEM

(75) Inventors: Susan Gaye Elkington, Colorado Springs, CO (US); Randall Hess, Colorado Springs, CO (US); Michael Dean Walker, Colorado Springs, CO (US); Jason Richard Huddleston, Peyton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 10/823,241

(22) Filed: Apr. 12, 2004

(65) Prior Publication Data

US 2005/0240649 A1    Oct. 27, 2005

(51) Int. Cl.
*G06F 3/00* (2006.01)
*H04L 12/28* (2006.01)

(52) U.S. Cl. .......................... 710/5; 370/412
(58) Field of Classification Search .......... 710/5, 710/52–57; 709/213–226; 370/412
See application file for complete search history.

(56) References Cited

U.S. PATENT DOCUMENTS

| | | | | |
|---|---|---|---|---|
| 5,056,003 A * | 10/1991 | Hammer et al. | ............. | 719/310 |
| 5,163,131 A * | 11/1992 | Row et al. | ................ | 709/202 |
| 5,603,066 A * | 2/1997 | Krakirian | ................ | 710/74 |
| 5,671,377 A * | 9/1997 | Bleidt et al. | ............... | 715/723 |
| 5,761,507 A * | 6/1998 | Govett | ..................... | 718/101 |
| 5,784,647 A * | 7/1998 | Sugimoto | ................. | 710/39 |
| 6,055,533 A | 4/2000 | Hogge | | |
| 6,055,564 A | 4/2000 | Phaal | | |
| 6,073,132 A | 6/2000 | Gehman | | |
| 6,205,484 B1 | 3/2001 | Eriksson | | |
| 6,314,477 B1 * | 11/2001 | Cowger et al. | ............... | 710/22 |
| 6,434,559 B1 | 8/2002 | Lundberg et al. | | |
| 6,922,414 B1 * | 7/2005 | Gunlock | .................. | 370/412 |
| 7,376,755 B2 * | 5/2008 | Pandya | ..................... | 709/250 |
| 2001/0011296 A1 * | 8/2001 | Chidambaran et al. | ...... | 709/203 |
| 2002/0013864 A1 * | 1/2002 | Dandrea et al. | ............... | 710/6 |
| 2003/0041115 A1 * | 2/2003 | Chen et al. | ................. | 709/213 |

OTHER PUBLICATIONS

Smith et al., Tachyon: A Gigabit Fibre Channel Protocol Chip, Oct. 1996, Hewlett-Packard Journal.*

* cited by examiner

*Primary Examiner*—Henry W. H. Tsai
*Assistant Examiner*—Hyun Nam

(57) ABSTRACT

A method of managing critical resource usage comprises monitoring queue depth in at least one critical resource queue for a high level of resource consumption and preventing subsequent commands of a client/server combination in response to a command that increases resource consumption to the high level. The method further comprises queuing an identifier of the client/server combination on a waiting queue, removing the client/server combination identifier from the waiting queue in queuing order as resource consumption declines, and enabling commands of the client/server combination.

21 Claims, 6 Drawing Sheets

RESOURCE MANAGEMENT SYSTEM

BACKGROUND OF THE INVENTION

Various types of data handling systems have multiple servers that supply services to multiple clients. These systems typically use several types of resources to perform various functions. These resources are generally consumed in varying degrees depending on the volume and type of data traffic imposed on the system. Performance can degrade in overall input/output latency due to the loads applied to the system.

For example in array controller systems, hosts can generate and array controllers can absorb more input/output traffic than the array controllers can process with low latencies. Limitations on processing capabilities of the array controllers largely relate to the number and size of internal queues to the controller. If not effectively managed, the input/output traffic can cause long latencies. Resources are effectively managed when the hosts supply as much work as possible while retaining acceptable latency.

SUMMARY

In accordance with an embodiment of a data handling system, a method of managing critical resource usage comprises monitoring queue depth in at least one critical resource queue for a high level of resource consumption and preventing subsequent commands of a client/server combination in response to a command that increases resource consumption to the high level. The method further comprises queuing an identifier of the client/server combination on a waiting queue, removing the client/server combination identifier from the waiting queue in queuing order as resource consumption declines, and enabling commands of the client/server combination.

BRIEF DESCRIPTION OF THE DRAWINGS

Embodiments of the invention relating to both structure and method of operation may best be understood by referring to the following description and accompanying drawings.

DETAILED DESCRIPTION

A data handling system and associated method improve performance with respect to overall latency. The illustrative method can improve performance in any suitable type of data handling system that includes resources with limited capacity. In a particular example, the technique is applied to array controller systems.

In one embodiment, an array controller monitors wait queue depth on multiple internal critical resources. The particular resources in a system are arranged according to specific system architecture. Examples of critical resources may include write cache dirty blocks, remote copy resources, disk waiters, and others. If queue depth exceeds threshold, then the resource enters a "critical" state. In the critical state, hosts or adapters can be enabled to issue one additional input/output command per logical unit (LUN) that uses the critical resource. After the one input/output command, all subsequent are returned with a status back to the host indicating that the resource is busy. The status is specific to the particular input/output protocol in use. Examples of status include Small Computer Systems Interface (SCSI) QUEUE FULL or BUSY status. A host/LUN marker or identifier is placed on a critical resource wait list which enables return to operation of host/LUN combinations in a fair manner as the resource becomes available and is no longer in a "critical" state.

The illustrative technique allocates resources fairly among the various hosts and LUNs. The hosts supply as much work as possible while retaining acceptable latency. Host input/output traffic is reduced in a manner that does not detrimentally affect other LUNs or host adapters connected to the same array controller. The technique can also enable any controller resource to supply information feedback to hosts. Accordingly, the array controller can consume an optimal amount of work, improving overall input/output latency.

Figure 1:
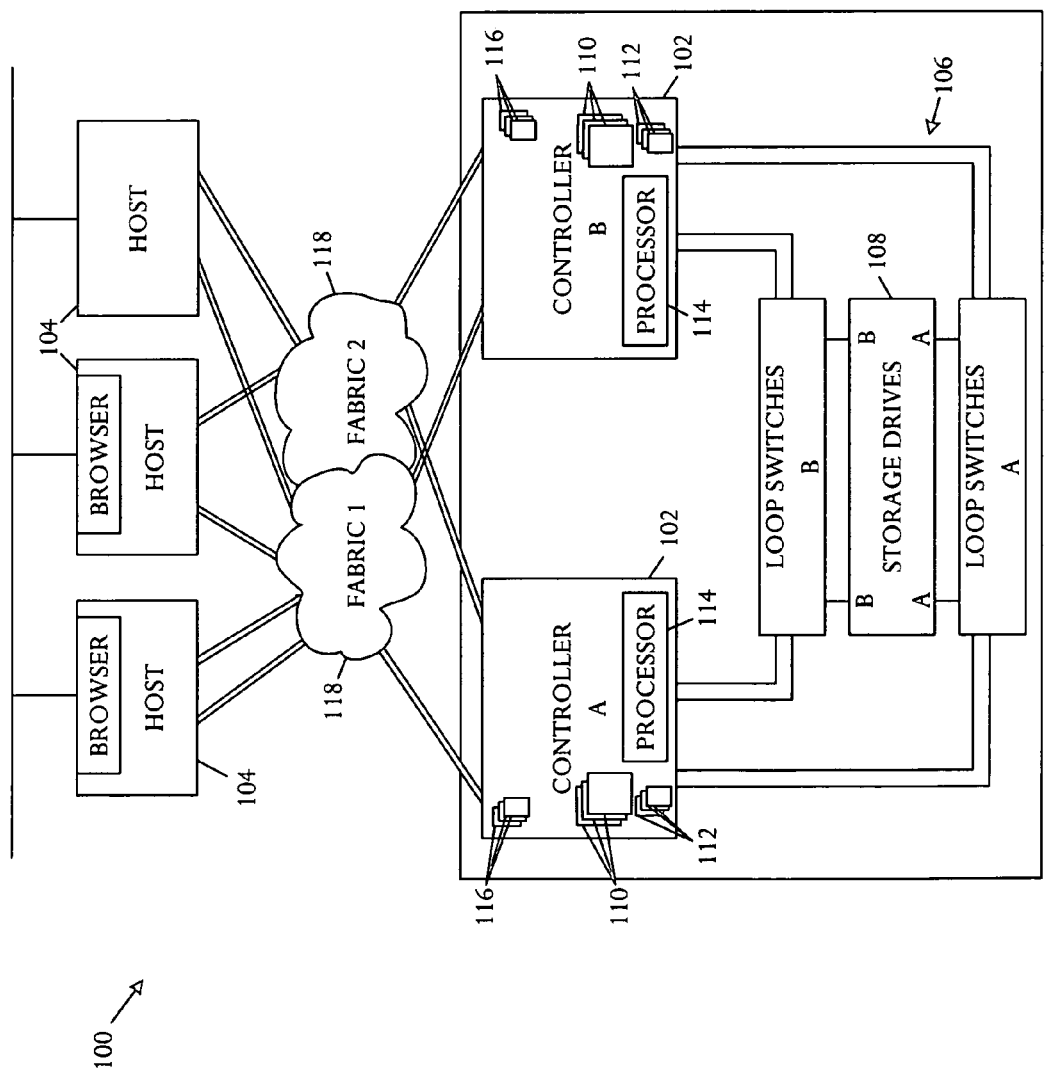
FIG. 1 is a schematic block diagram illustrating an embodiment of a storage system that is capable of improving performance with respect to overall input/output operation latency.

Referring to FIG. 1, a schematic block diagram illustrates an embodiment of a storage system 100 that is capable of improving performance with respect to overall input/output operation latency. The storage system 100 includes one or more storage controllers 102 capable of controlling data transfers between at least one host adapter 104 and at least one storage array 106. The storage arrays 106 typically include a large capacity of physical storage, for example in storage disk drives 108, and are configured as logical storage, generally arranged in logical units (LUNs).

The storage system further includes at least one resource 110 that is utilized in the data transfers, and at least one critical resource queue 112 respectively associated with the resource 110. Various resources may affect overall input/output latency and throughput, and thus may be considered "critical" resources. Examples of such resources include dynamic caching structures, queues, buffers, remote copy resources, cache dirty blocks, remote copy resources, disk wait queues, and others.

The critical resource queues 112 queue accesses of the associated resources 110. A logic 114, for example a processor or controller in the storage controllers 102, monitors the critical resource queues 112 for a predetermined or predefined high consumption condition, and identifies an adapter/LUN combination associated with a command that contributes to the high consumption condition. The logic 114 queues the identified adapter/LUN combination on a waiting queue, and prevents subsequent commands of the identified adapter/LUN combination.

In some implementations, the logic 114 subsequently detects a decline in resource consumption and dequeues the adapter/LUN combination identifier from the waiting queue, then re-enables commands of the dequeued adapter/LUN combination.

Generally, the illustrative system and technique for attaining efficient host throttling are applied for host adapters 104 that require a specific resource 110. Host adapters that do not require a specific resource generally use any available resource. Accordingly, the logic 114 can manage critical resource usage for host adapters 104 that require a specific resource 110.

In some implementations, the logic 114 detects receipt of a command from an adapter 104 to a LUN that increases consumption of a particular resource 110 that is concurrently burdened by multiple executing commands to a level above a preselected limit or threshold, and sets a flag indicative of a critical condition of the resource. The logic 114 allows the received command to complete but rejects subsequent commands issued by the adapter 104 to the LUN.

Other implementations may detect increased consumption according to various other high consumption criteria such as an increased rate of command delivery, a preponderance of particular types of burdensome traffic, or other conditions that may be detected with additional analysis.

In some embodiments, the logic 114 detects an increase consumption of a particular resource 110 to a level above the preselected limit, and queues an identifier of the adapter/LUN combination on a waiting queue 116 associated with the resource 110. The logic 114 can also detect a decline in consumption of the resource 110. In response to a decline in consumption, the logic 114 removes an adapter/LUN combination identifier from the waiting queue 116 in the queue order and enables subsequent commands of the adapter/LUN combination removed from the waiting queue 116.

Various criteria may be tracked to monitor consumption. For example, a decline in consumption may be discernible simply as a decrease in queue depth below the selected limit. In a particular implementation, the waiting queue 116 may be freed more aggressively as the queue becomes less full, a technique that is possible because freeing of a waiting queue does not necessarily generate another usage of the critical resource. For example, if the critical resource is nearly in a critical state with a queue depth D, and the current queue depth after returning a resource is C, then the number of adapter/LUN combinations freed can be D-C.

Figure 2:
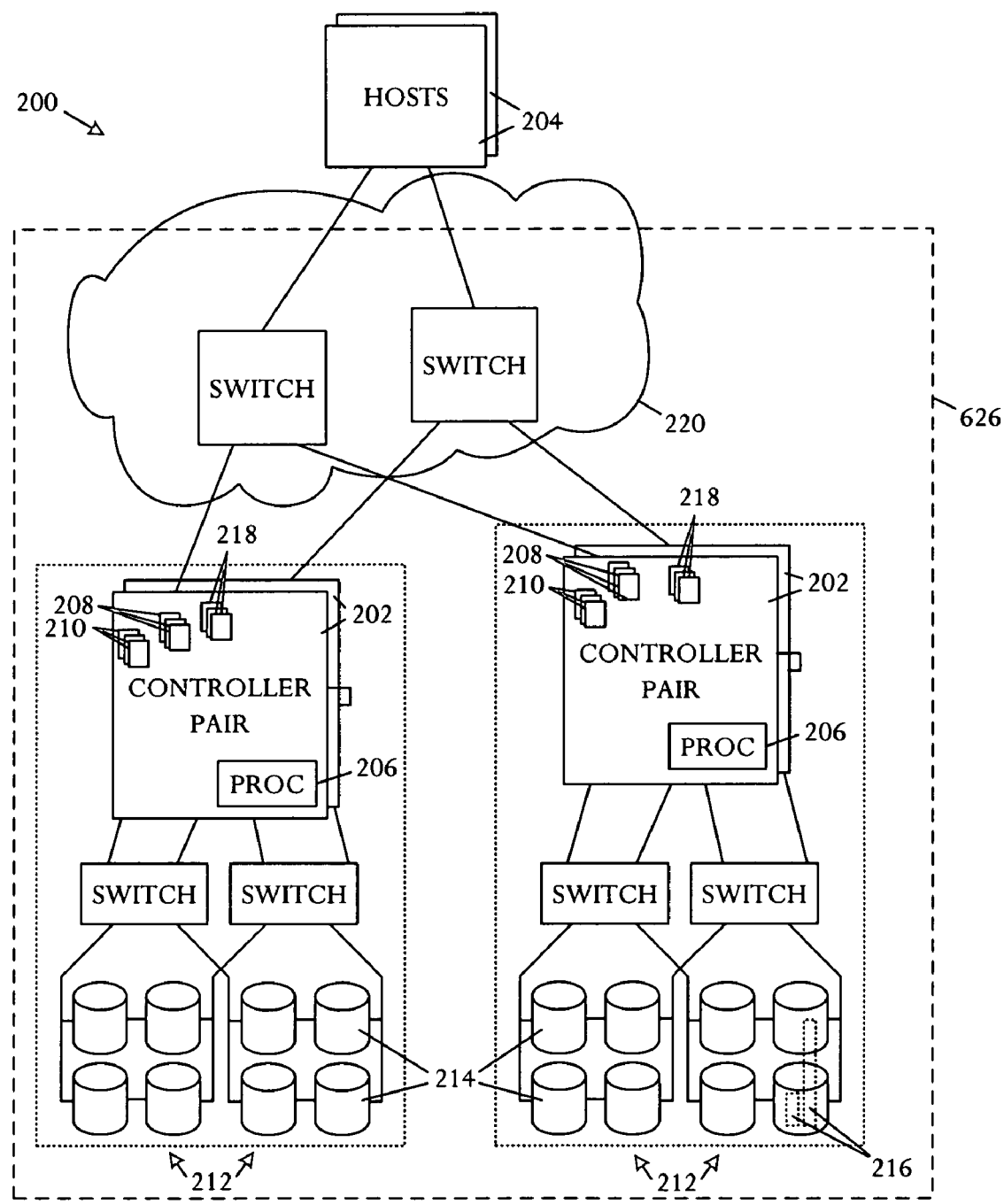
FIG. 2 is a schematic block diagram depicting an alternative embodiment of a storage system that includes a resource management system to enable a storage controller to throttle host input/output activity.

Referring to FIG. 2, a schematic block diagram illustrates an alternative embodiment of a storage system 200 that includes a resource management system to enable a storage controller 202 to throttle host input/output activity. In some embodiments, the resource management system enables a controller 202 to throttle host input/output traffic that specifies usage of a particular internal resource when that resource is heavily utilized. In a particular embodiment, only those host adapters 204, also called hosts, that specify the particular resource are constrained to wait for availability of the resource. The resource management system implements a "fairness" technique that enables each host 204 to perform input/output commands in the order of command denial as resources again become available.

The resource management system typically responds to input/output commands rejected due to resource starvation by returning either a QUEUE FULL or BUSY response, depending on the definition of the particular invoked operating system.

For hosts that may have unsatisfactory performance in response to resource management system behavior, some embodiments may allow the resource management system to be disabled for all host types.

The storage system 200 and associated resource management system may be extensible to enable addition of sensors.

In an illustrative embodiment, the resource management system can execute in processors 206 internal to the storage controllers 202. Controller routines that result in consumption of any monitored critical resources execute a macro, called a resource-use macro. A "critical" resource is one that degrades latency performance in high usage conditions. Controller routines that free such a critical resource execute a macro, called a resource-free macro.

The resource management system defines one or more resource sensors 208. Individual resource sensors 208 use an indexed structure to monitor associated respective resources 210. The resource sensor structure contains a current count of resources consumed, a maximum quota value for that particular resource and pointers to the first and last entry in a waiter queue. Multiple sets of macros can be defined and used to enable manipulation of the use count, resources required, and the waiter queue. An example of a resource sensor structure is shown as follows:

typedef struct_critical_resource

| typedef struct_critical_resource |
|---|
| {<br>ushort   cur;     /* Current queue count */<br>ushort   max;    /* Maximum queue count */<br>ulong    qfirst;   /* First waiter */<br>ulong    qlast;    /* Last waiter */<br>} critical_resources; |

Each resource sensor structure maintains a maximum value for the specific resource that is monitored. If consumption of a specific resource exceeds the specified limit, a corresponding bit is set in the critical resources flag indicating that the resource is near exhaustion. Upon receipt of a command requiring a specific resource that has exceeded the predetermine quota, the command is allowed to complete, but a flag is set to prevent further input/output commands from being issued from the adapter that issued the command and are directed to the logical unit (LUN) targeted by the command. In the illustrative embodiment, the storage controller 202 controls one or more storage arrays 212 that include a plurality of storage drives 214. The storage arrays 212 and drives 214 make up physical storage that can be configured as logical storage in logical units (LUNs) 216. The adapter 204 and LUN 216 are termed an "adapter/LUN combination". An index identifying the specific adapter/LUN combination is placed on a waiting queue 218 to wait for more resources to become available.

As resources 210 become available, adapter/LUN combinations are removed from the waiting queue 218 and allowed to perform additional input/output commands. An exhausted bit for a specific resource remains set until the last adapter/LUN combination is removed from the waiting queue 218, enabling the system's input/output command pipeline to drain a suitable amount before additional heavy input/output loading resumes. An aspect of the behavior is that a host adapter 204 may return from the queue, perform a predetermined number of additional successful input/output commands, and then be placed back at the end of the queue again. In an illustrative embodiment, one additional command is performed.

In a particular system embodiment that includes Small Computer Systems Interface (SCSI) functionality, a storage controller 202 can receive commands from an adapter 204, for example at HP$NEW, a host port entry for SCSI commands received from an adapter 204. HP$NEW performs operations such as validating commands for execution. One example of a validation operation is checking of flags or bits to determined whether the command is to be disabled due to the high consumption condition. At a point in HP$NEW at which a command is validated sufficiently that the command is to be executed, and the command is determined to be a READ or WRITE operation, the critical resource flags or bits are examined to determine whether a required resource has reached a limit or quota. If a required resource is exhausted, as determined by the critical resource bits, a disable flag or bit is set to indicate that no additional WRITE and/or READ input/output operation is to be allowed through the particular adapter/LUN combination. A macro, for example CR_QUEUE_WAITER, is executed to place the adapter/LUN combination on the waiting queue 218. The command in the process is then allowed to proceed normally through the execution pipeline. At an earlier point in execution of HP$NEW, for example after precursory checks for the command are performed, additional input/output traffic is diverted from an execution critical path to HP$NEW_UNUSUAL, which queues commands blocked by a busy status of a resource, thereby reducing or minimizing processing of the blocked commands.

In an illustrative system, macros are supplied for manipulation of the resource sensor current queue count.

CR_USE_WR_RESOURCE (CR_IDX) is a resource sensor current queue count manipulation macro that enables a command to use a Write resource. CR_IDX is an index identifier of the pertinent critical resource. The macro increases the queue count and checks for critical usage.

CR_USE_RW_RESOURCE (CR_IDX) is a resource sensor current queue count manipulation macro that enables a command to use a Read/Write resource. CR_IDX is an index identifier of the pertinent critical resource. The macro increases the queue count and checks for critical usage.

CR_FREE_WR_RESOURCE (CR_IDX) is a resource sensor current queue count manipulation macro that frees a Write resource.

CR_FREE_RW_RESOURCE (CR_IDX) is a resource sensor current queue count manipulation macro that frees a Read/Write resource.

Some macros are resource required manipulation macros.

CR_SET_RESOURCE_IN_USE (CR_IDX, UNIT) is a resource required manipulation macro specifying that the particular UNIT requires a specific resource. UNIT identifies a particular adapter 204 or other device, operating as a client. The macro identifies the specific client and the specific resource that is required for use by the client.

CR_FREE_RESOURCE_IN_USE (CR_IDX, UNIT) is a resource required manipulation macro that indicates the particular UNIT does not require a specific resource. Accordingly, the adapter or other client identified by UNIT is dissociated from the specific resource.

CR_CLEAR_DRM_TUNNEL_RESOURCE (UNIT) is a resource required manipulation macro that indicates the particular UNIT requires no Digital Resource Management (DRM) Tunnel resources.

Other macros are waiting queue manipulation macros.

CR_QUEUE_WAITER (ACB, LUN, CR_MASK, LW) is a waiting queue manipulation macro that adds an adapter/LUN combination to the waiting queue 218 for the resource specified in CR_MASK/LW. ACB is an index to the adapter control block and LUN identifies the logical unit for the pertinent adapter/LUN combination.

CR_FREE_RW_WAITERS (CR_IDX, COUNT) is a waiting queue manipulation macro that removes a number of adapter/LUN combinations identified by the COUNT field from the waiting queue 218. The identified adapter/LUN combinations are waiting for the waiting queue 218 associated with the critical resource identified by the CR_IDX field. The macro also clears both Read and Write flags when the last waiting adapter/LUN combination index is removed from the waiting queue 218.

CR_FREE_ALL_RW_WAITERS (CR_IDX) is a waiting queue manipulation macro that frees all adapter/LUN combinations waiting for the critical resource identified by the CR_IDX field, and clears both Read and Write flags when the last waiting adapter/LUN combination index is removed from the waiting queue 218.

CR_FREE_RW_WAITERS (CR_IDX, COUNT) is a waiting queue manipulation macro that removes the number of adapter/LUN combinations identified by the COUNT field from the waiting queue 218. The identified adapter/LUN combinations are waiting for the waiting queue 218 associated with the critical resource identified by the CR_IDX field. The macro also clears the Write flag when the last waiting adapter/LUN combination index is removed from the waiting queue 218.

CR_FREE_ALL_WR_WAITERS (CR_IDX) is a waiting queue manipulation macro that frees all adapter/LUN combinations waiting for the critical resource identified by the CR_IDX field, and clears the Write flag when the last waiting adapter/LUN combination index is removed from the waiting queue 218.

Various resources 210 may be managed using the disclosed techniques, depending on constituent devices, components, and characteristics of the data handling system. Sensors 208 implemented in a particular embodiment include Data Replication Manager (DRM) tunnels for peer-to-peer data replication, cache dirty block waiting queues, and disk unit waiting queues. Indices can be allocated for subsequent addition of sensors.

DRM tunnels have limited resources for transferring write commands from a digital resource source to a digital resource destination. As the number of writes to the controller 202 that are to be replicated increases, the tunnel depletes resources and further write commands are queued to a DRM tunnel resource queue, one of the critical resources in the system 200.

Cache dirty block waiting queues can be another critical resource 210. Write commands are accepted by the controller 202, placed in a controller cache as dirty data, and later flushed to disks 214 in the storage array 212. The controller 202 limits the amount of "dirty" data that the cache may contain. Once the limit is reached, additional write commands are queued, waiting for a cache flush to reduce the level of dirty data.

Management of the critical resources waiting queue 218 is performed using the Adapter Control Block (ACB) index and logical unit (LUN) of a specific input/output path to form a pointer into a fixed-size, pre-allocated table. Once an adapter/LUN combination has used some amount of a critical resource, the adapter/LUN combination is queued to the critical resource waiting queue 218. Each critical resource 210 has an associated critical resource waiting queue 218. A particular implementation has five queues, four allocated to digital resource tunnels and one to cache dirty block waiting queues. When a critical resource becomes available for use, the adapter/LUN combination is dequeued.

The resource management system can be implemented to return a SCSI status of either QUEUE FULL or BUSY in response to commands for which a resource designated as required has reached the consumption quota or limit. Default behavior can be to return a QUEUE FULL status to such commands. An alternate status of BUSY can be returned by specification by the Host Mode of the adaptor executing the command.

Some adaptors may include a control capability to enable and disable resource management system functionality.

FIG. 2 illustrates a storage system 200 that includes controllers 202 arranged in pairs, and including multiple storage arrays 212 and controller pairs. The resource management system can be implemented in either or both controllers in a pair, or in a remote controller 202 via a network 220. Inter-controller resource management can be implemented in a continuous access configuration to prevent input/output traffic on a client, such as an adapter, from overwhelming a server. Inter-controller resource management also can be implemented to fairly allocate access of clients to a server.

Figure 3:
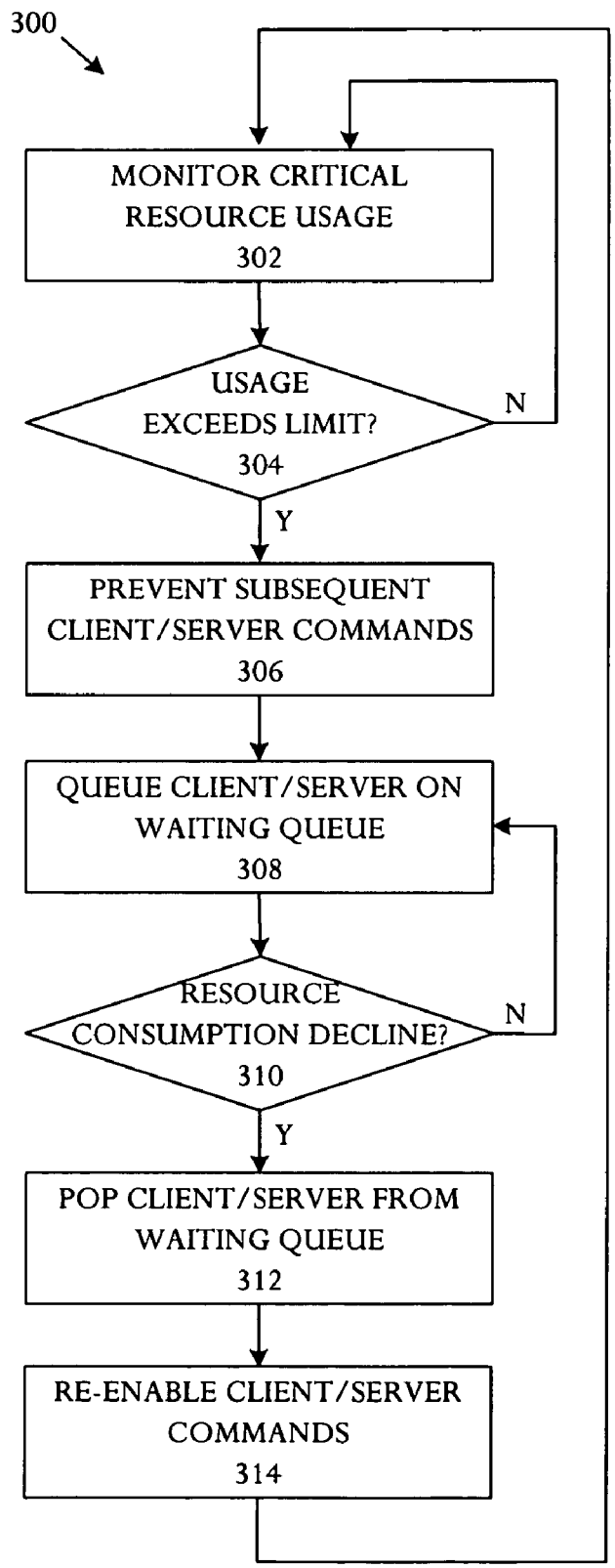
FIG. 3 is a flow chart showing an embodiment of a method capable of usage by a data handling system for managing critical resource usage.

Referring to FIG. 3, a flow chart depicts an embodiment of a method 300 capable of usage by a data handling system for managing critical resource usage. The method can be performed on a controller or processor that executes resource management functionality in a data path or pipeline between one or more clients and one or more servers. The method executes over time and monitors 302 queue depth in at least one critical resource queue to detect resource consumption greater than a preselected limit. In the event of critical resource usage above the limit 304, the method prevents 306 subsequent commands of a client/server combination in response to a command that increases resource consumption to a level above the preselected limit. An identifier of the client/server combination is queued 308 on a waiting queue. When resource consumption declines 310, the client/server combination identifier is removed 312 from the waiting queue in queuing order. Commands of the client/server combination are re-enabled 314. In a particular embodiment, commands of a client/server combination are re-enabled in order of queuing as resource availability is restored.

A typical resource management implementation manages critical resource usage for clients that require usage of a specific resource. For example, a client not requiring a specific resource typically can use any available resource.

In a particular embodiment, the method can be implemented in a storage system that includes one or more storage controllers, one or more host adapters operational as clients, and one or more storage arrays configured as physical storage and logical storage. The logical storage can be arranged in logical units (LUNs) that are operational as servers. An adapter/LUN combination is operational as a client/server combination. Resources for the storage system may include dynamic caching structures, queues, buffers, remote copy resources, cache dirty blocks, disk wait queues, and others, depending on the particular system configuration.

Figure 4A:
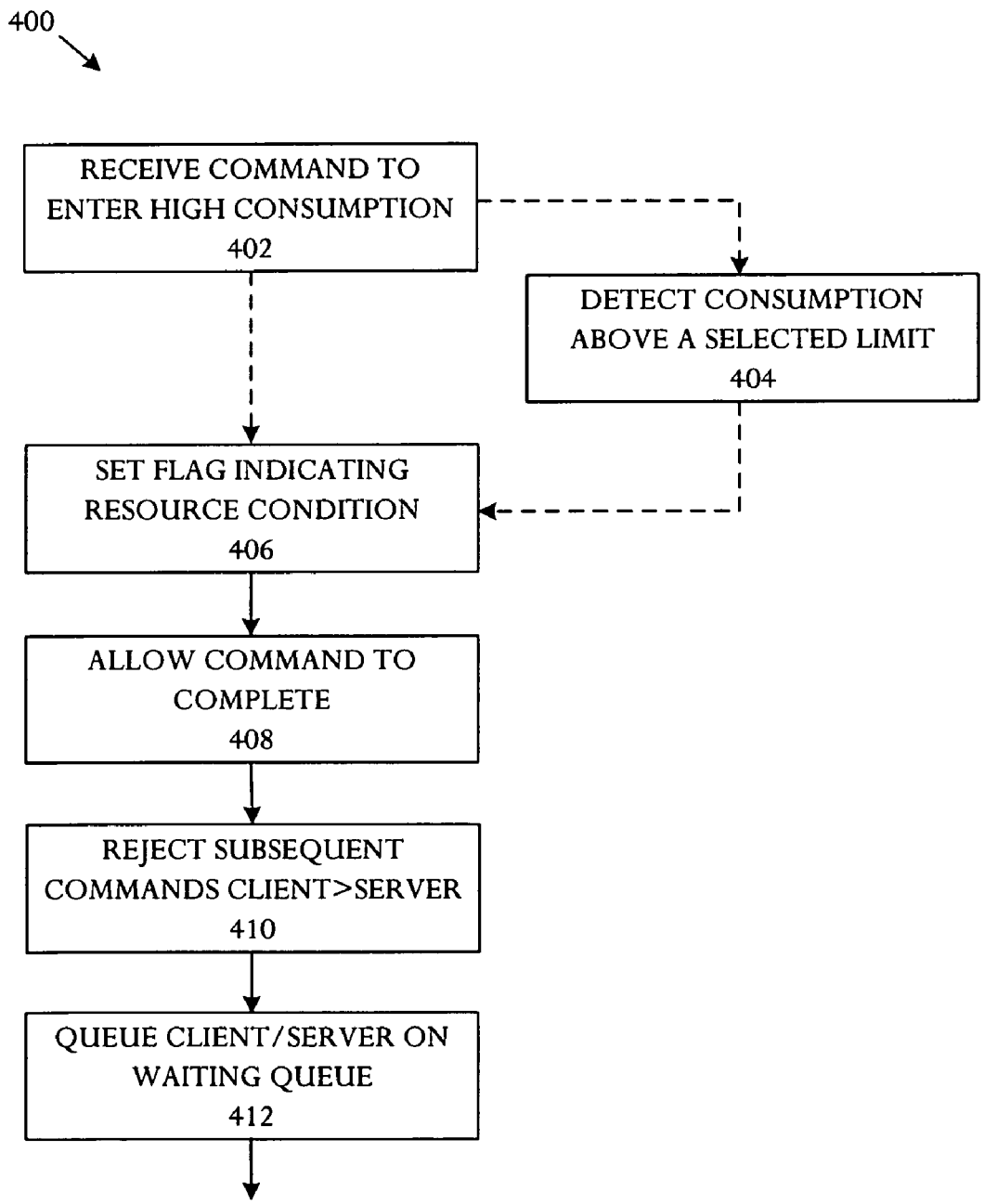
FIGS. 4A and 4B are flow charts that depict another embodiment of a method capable of usage by a data handling system for managing critical resource usage.
Figure 4B:
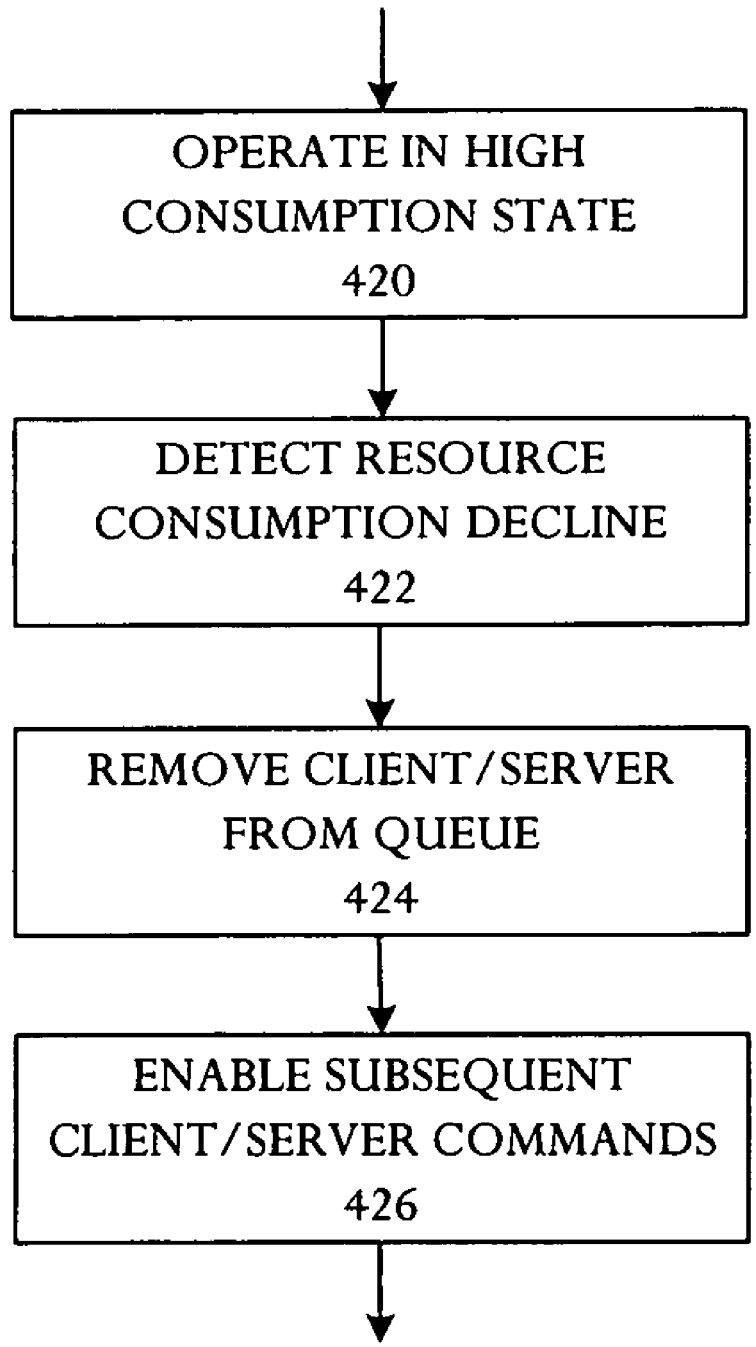

Referring to FIGS. 4A and 4B, flow charts depict another embodiment of a method 400 capable of performance by a data handling system for managing critical resource usage. The method implements resource management functionality in a data path or pipeline between one or more clients and one or more servers. Referring to FIG. 4A, a command from a client to a server is received 402 that increases consumption of a resource to a high consumption condition, which may be termed a "critical" condition. For example, a resource manager can detect 404 an increase in consumption of a resource above the preselected limit. The resource manager sets 406 a flag indicative of a critical condition of the resource. The resource manager allows 408 the command to complete and rejects 410 subsequent commands issued by the client to the server. In some implementations, the resource manager queues 412 an identifier of the client/server combination on a waiting queue associated with the resource.

Referring to FIG. 4B, generally when the resource manager is managing a resource in a high consumption state 420, the resource manager may detect 422 a decline in consumption of the resource. In response to reduced consumption, a client/server combination identifier is removed 424 or popped from the waiting queue in the queue order. Subsequent commands of the client/server combination that is removed from the waiting queue are enabled 426.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 5:
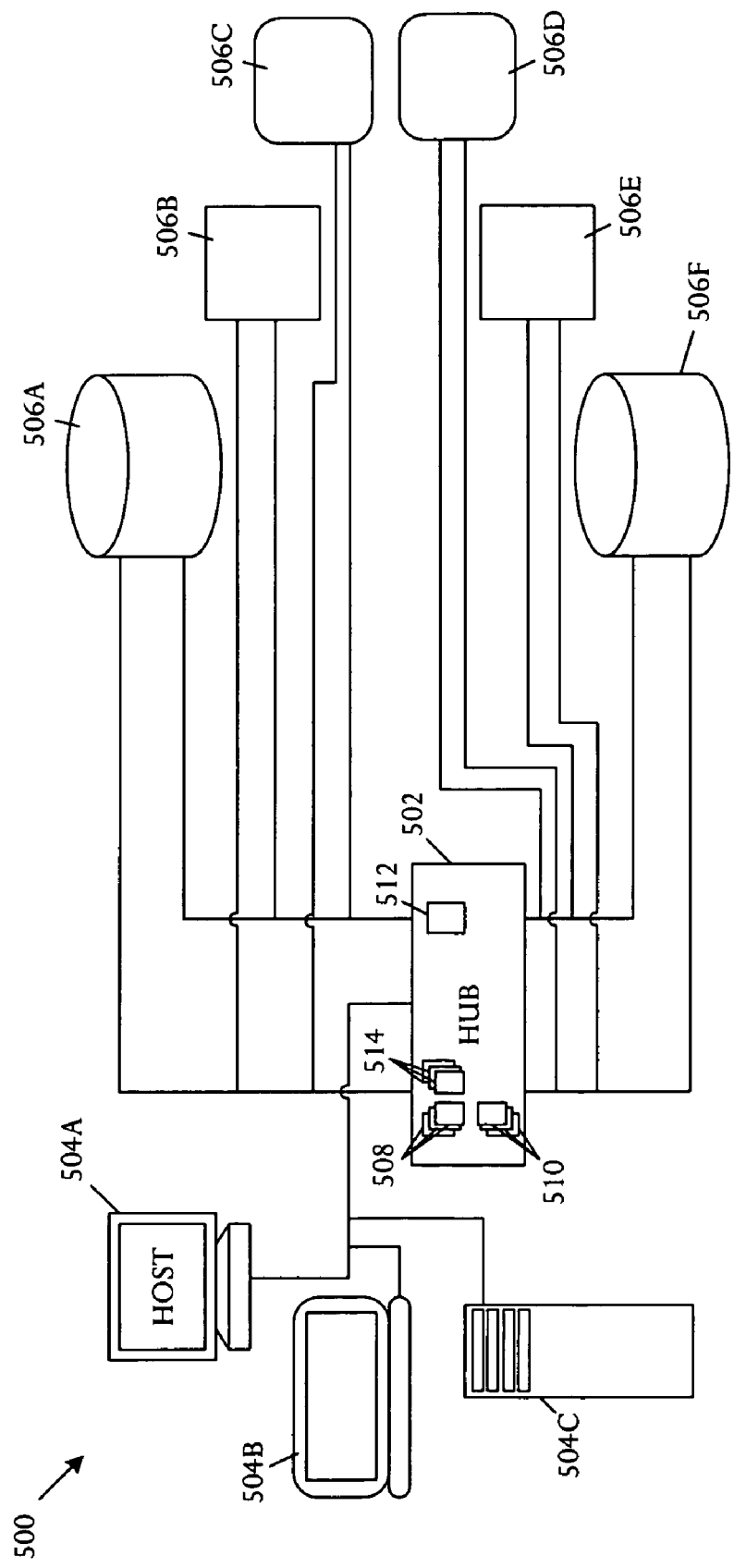
FIG. 5 is a schematic block diagram illustrating an embodiment of a data handling system including one or more controllers capable of controlling data transfers between at least one client and at least one server.

Referring to FIG. 5, a schematic block diagram illustrates an embodiment of a data handling system 500 that includes one or more controllers 502 capable of controlling data transfers between at least one client 504A-C and at least one server 506A-F. The system further includes one or more resources 508 for usage in performing data transfers and one or more critical resource queues 510 that are respectively associated with the resources 508 and can queue accesses to the associated resource 508. The system 500 further includes a logic 512, such as a processor or central processing unit (CPU), controller, and the like. The logic 512 executes various operations such as a resource management operation. In a particular example, the logic 512 monitors the critical resource queues 510 to detect a predetermined high consumption condition. The logic 512 identifies a source/client combination associated with a command that contributes to the high consumption condition and queues the identified source/client combination on a waiting queue 514. For a queued source/client combination, the logic 512 prevents subsequent commands for the identified source/client combination.

In various data handling system implementations, the controllers 502 can take several forms, such as data hubs, routers, bridges, storage controllers, communication controllers, network management devices, and the like. Similarly, the clients 504A-C may similarly be in different forms such as computers, hosts, adapters, on-line terminals, point-of-sale terminals, laptop computers, palm computers, Asynchronous Transfer Mode (ATM) terminals, and many others. Also, the servers 506A-F may be different types of server devices capable of performing a variety of services for the clients.

Some systems 500 may include many different server types. Others may include only a single server type. Any suitable type of servers 506A-F may be included in the data handling system including various storage system servers such as storage arrays or logical units (LUNs), or in various database servers, communication servers, computing system servers, and the like.

In some implementations, the logic 512 detects receipt of a command from a client 504A-C to a server 506A-F that increases consumption of a resource 508 to a level above a preselected limit. If so, the logic 512 sets a flag indicative of a high consumption condition, for example called a critical condition, of the resource 508. The logic 512 allows the received command to complete, and rejects subsequent commands issued by the client 504A-C to the server 506A-F.

Also in some implementations, the logic 512 may detect an increase consumption of a resource 508 to a level above the preselected limit and queue an identifier of the client/server combination on a waiting queue 514 associated with the resource 508. The logic 512 may also detect a decline in consumption of the resource 508 and respond by removing a client/server combination identifier from the waiting queue 514 in the order in which the identifiers were placed on the queue. The logic 512 enables subsequent commands of the client/server combination removed from the waiting queue 514.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, the illustrative resource management techniques may be implemented in any types of storage systems that are appropriate for such techniques, including any appropriate media. Similarly, the illustrative techniques may be implemented in any appropriate storage system architecture. The task management techniques may further be implemented in devices other than storage systems including computer systems, data processors, application-specific controllers, communication systems, and the like.

What is claimed is:

1. A method of managing resource usage comprising:
pushing commands indicating accesses of at least one resource onto at least one resource queue;
monitoring queue depth in the at least one resource queue for a predetermined level of resource consumption;
preventing issue of subsequent commands from a client of at least one client to a server of at least one server in response to a command from the client to the server that increases resource consumption to the predetermined level;
identifying the client and the server for which the command increases resource consumption to the predetermined level as a client/server combination identifier;
pushing the client/server combination identifier onto a waiting queue associated with a resource for which the resource consumption is increased to the predetermined level, the waiting queue for queuing a plurality of client/server combination identifiers;
detecting a decline in consumption of a resource of the at least one resource;
popping a client/server combination identifier from a waiting queue associated with the resource for which a decline in consumption is detected in order of queuing; and
re-enabling issue of commands from the client to the server designated by the popped client/server combination identifier.

2. The method according to claim 1 further comprising:
managing resource usage for clients that require a specific resource.

3. The method according to claim 1 further comprising:
enabling issue of commands from a client to a server identified by a client/server combination identifier in order of queuing as resource availability is restored.

4. The method according to claim 1 further comprising:
receiving a command from a client to a server that increases consumption of a resource to a predetermined resource consumption condition;
setting a flag indicative of the predetermined resource condition;
allowing the command to complete; and
rejecting subsequent commands issued by the client to the server.

5. The method according to claim 1 further comprising:
detecting an increase in consumption of a resource to a level above a preselected limit; and
pushing the client/server combination identifier on a waiting queue associated with the resource.

6. The method according to claim 5 further comprising:
detecting a decline in consumption of the resource;
removing a client/server combination identifier from the waiting queue in the queue order; and
enabling subsequent commands from a client to a server identified by the client/server combination identifier removed from the waiting queue for operation.

7. The method according to claim 1 implemented in a storage system further comprising:
at least one storage controller;
at least one host adapter operational as a client;
at least one storage array configured as physical storage and logical storage, the logical storage being arranged in logical units (LUNs) operational as servers;
at least one adapter/LUN combination operational as a client/server combination; and
at least one resource selected from a group consisting of dynamic caching structures, queues, buffers, and remote copy resources.

8. A storage system comprising:
at least one storage controller controlling data transfers between at least one host adapter and at least one storage array configured as physical storage and logical storage, the logical storage being arranged in logical units (LUNs);
at least one resource utilized in the data transfers;
at least one resource queue respectively associated with the at least one resource that queues commands indicating accesses to the associated resource; and
a logic that pushes commands indicating accesses of at least one resource onto at least one resource queue, monitors queue depth in the at least one resource queue for a predetermined resource consumption condition, detects a condition of an adapter that issues a command to a LUN that contributes to the predetermined resource consumption condition, identifying the adapter that issues the command and LUN by an adapter/LUN combination identifier, pushing the adapter/LUN combination identifier on a waiting queue for queuing a plurality of adapter/LUN combination identifiers associated with a resource for which the resource consumption is increased to the predetermined level, and prevents issue of subsequent commands of the identified adapter/LUN combination.

9. The storage system according to claim 8 further comprising:
a logic that detects a decline in resource consumption of a predetermined resource, dequeues the adapter/LUN combination identifier from a waiting queue associated with the predetermined resource for which a decline in consumption is detected, and re-enables commands of the dequeued adapter/LUN combination for operation.

10. The storage system according to claim 8 further comprising:
at least one resource selected from a group consisting of dynamic caching structures, queues, buffers, and remote copy resources.

11. The storage system according to claim 8 further comprising:
a logic that manages resource usage for host adapters that require a specific resource.

12. The storage system according to claim 8 further comprising:
a logic that detects receipt of a command from an adapter to a LUN that increases consumption of a resource above a preselected limit, sets a flag indicative of a predefined condition of the resource, allows the received command to complete, and rejects subsequent commands issued by the adapter to the LUN.

13. The storage system according to claim 8 further comprising:
a logic that detects an increase consumption of a resource above the preselected limit, and queues an adapter/LUN combination identifier on a waiting queue associated with the resource.

14. The storage system according to claim 13 further comprising:
a logic that detects a decline in consumption of the resource, removes an adapter/LUN combination identifier from the waiting queue in the queue order, and enables subsequent commands of the adapter/LUN combination removed from the waiting queue for operation.

15. A data handling system comprising:
at least one controller controlling data transfers between at least one client and at least one server;
at least one resource utilized in the data transfers;
at least one resource queue respectively associated with the at least one resource that queues commands indicating accesses to the associated resource; and
a logic that pushes commands indicating accesses of at least one resource onto at least one resource queue, monitors queue depth in the at least one resource queue for a predetermined resource consumption condition, detects a condition of a source that issues a command to a client that contributes to the predetermined resource consumption condition, identifying the source that issues the command and the client by a client/source combination identifier, pushing the source/client combination identifier on a waiting queue for queuing a plurality of client/server combination identifiers associated with a resource for which the resource consumption is increased to the predetermined level, and prevents issue of subsequent commands of the identified source/client combination.

16. The system according to claim 15 further comprising:
a logic that detects receipt of a command from a client to a server that increases consumption of a resource above a preselected limit, sets a flag indicative of a predefined condition of the resource, allows the received command to complete, and rejects subsequent commands issued by the client to the server.

17. The system according to claim 15 further comprising:
a logic that detects an increase in consumption of a resource above the preselected limit, queues a client/server combination identifier on a waiting queue associated with the resource.

18. The system according to claim 17 further comprising:
a logic that detects a decline in consumption of the resource, removes a client/server combination identifier from the waiting queue in the queue order, and enables subsequent commands of the client/server combination removed from the waiting queue for operation.

19. An article of manufacture comprising:
a non-transitory computer readable medium having a readable program code embodied therein for managing resource usage, the readable program code further comprising:
a code causing a controller to push commands indicating accesses of at least one resource onto at least one resource queue;
a code causing the controller to monitor for a predefined level of resource consumption;
a code causing the controller to prevent issue of subsequent commands from a client of at least one client to a server of at least one server in response to a command from the client to the server that increases resource consumption to the predefined level;
a code causing the controller to identify the client and the server for which the command increases resource consumption to the predetermined level as a client/server combination identifier;
a code causing the controller to push the client/server combination identifier onto a waiting queue associated with a resource for which the resource consumption is increased to the predetermined level, the waiting queue for queuing a plurality of client/server combination identifiers;
a code causing the controller to detect a decline in consumption of a resource of the at least one resource;
a code causing the controller to pop a client/server combination identifier from a waiting queue associated with the resource for which a decline in consumption is detected in order of queuing; and
a code causing the controller to enable issue of commands from the client to the server designated by the popped client/server combination identifier.

20. The article of manufacture according to claim 19 further comprising:
a code causing the controller to manage resource usage for clients that require a specific resource;
a code causing the controller to receive a command from a client to a server that increases consumption of a resource above a preselected limit;
a code causing the controller to set a flag indicative of a condition of the resource;
a code causing the controller to allow the command to complete; and
a code causing the controller to reject subsequent commands issued by the client to the server.

21. The article of manufacture according to claim 19 further comprising:
a code causing the controller to detect an increase in consumption of a resource above a preselected limit;
a code causing the controller to queue a client/server combination identifier on a waiting queue associated with the resource;
a code causing the controller to detect a decline in consumption of the resource;
a code causing the controller to remove a client/server combination identifier from the waiting queue in the queue order; and
a code causing the controller to enable subsequent commands from a client to a server identified by the client/server combination identifier removed from the waiting queue for operation.

* * * * *